United States Patent
Fischer (10) Patent No.: US 11,816,486 B2
(45) Date of Patent: Nov. 14, 2023

(54) EFFICIENT INTER-THREAD COMMUNICATION BETWEEN HARDWARE PROCESSING THREADS OF A HARDWARE MULTITHREADED PROCESSOR BY SELECTIVE ALIASING OF REGISTER BLOCKS

(71) Applicant: NXP B.V., Eindhoven (NL)

(72) Inventor: Michael Andrew Fischer, San Antonio, TX (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/577,577

(22) Filed: Jan. 18, 2022

(65) Prior Publication Data

US 2023/0229445 A1    Jul. 20, 2023

(51) Int. Cl.
  *G06F 9/30*  (2018.01)
  *G06F 9/38*  (2018.01)

(52) U.S. Cl.
  CPC ........ *G06F 9/30123* (2013.01); *G06F 9/3851* (2013.01); *G06F 9/30127* (2013.01)

(58) Field of Classification Search
  CPC ............. G06F 9/30123; G06F 9/30127; G06F 9/3851; G06F 9/34
  See application file for complete search history.

(56) References Cited

U.S. PATENT DOCUMENTS

| | | | |
|---|---|---|---|
| 5,524,250 A | 6/1996 | Chesson et al. | |
| 7,117,346 B2 | 10/2006 | Moyer et al. | |
| 7,120,783 B2 | 10/2006 | Fotland et al. | |
| 2005/0228975 A1* | 10/2005 | Shippy | G06F 9/3851 712/225 |
| 2009/0013329 A1* | 1/2009 | May | G06F 9/30123 712/E9.032 |
| 2009/0089553 A1* | 4/2009 | Bybell | G06F 9/3851 712/E9.023 |

(Continued)

OTHER PUBLICATIONS

Killeen, Tim et al. "Reducing Interprocess Communication Overhead through Register Windows." *Proceedings of the Twenty-Seventh Southeastern Symposium on System Theory.* ©1995 IEEE. pp. 130-134.

(Continued)

*Primary Examiner* — Courtney P Carmichael-Moody (57) ABSTRACT

A hardware multithreaded processor including a register file, a thread controller, and aliasing circuitry. The thread controller is configured to assign each of multiple hardware processing threads to a corresponding one of multiple register block sets in which each register block set includes at least two of multiple register blocks and in which each register block includes at least two registers. The aliasing circuitry is programmable to redirect a reference provided by a first hardware processing thread to a register of a register block assigned to a second hardware processing thread. The reference may be a register number in an instruction issued by the first hardware processing thread. The register number is converted by the aliasing circuitry to a register file address locating a register of the register block assigned to the second hardware processing thread. The aliasing circuitry may include a programmable register for one or more threads.

17 Claims, 6 Drawing Sheets

(56) References Cited

U.S. PATENT DOCUMENTS

| | | | |
|---|---|---|---|
| 2009/0100249 A1* | 4/2009 | Eichenberger | G06F 9/3012 712/42 |
| 2010/0005277 A1* | 1/2010 | Gibert | G06F 9/526 712/1 |
| 2012/0144395 A1* | 6/2012 | Bohrer | G06F 9/546 718/103 |
| 2017/0153922 A1* | 6/2017 | Alapati | G06F 9/30189 |
| 2019/0340022 A1* | 11/2019 | Brewer | G06F 9/3851 |
| 2023/0169163 A1 | 6/2023 | Fischer et al. | |

OTHER PUBLICATIONS

U.S. Appl. No. 17/586,708, Fisher, Michael Andrew: "Selectable Register File Blocks for Hardware Threads of a Multithreaded Processor", filed Jan. 27, 2022.

* cited by examiner

EFFICIENT INTER-THREAD COMMUNICATION BETWEEN HARDWARE PROCESSING THREADS OF A HARDWARE MULITITHREADED PROCESSOR BY SELECTIVE ALIASING OF REGISTER BLOCKS

BACKGROUND

Field of the Invention

The present invention relates in general to hardware multithreaded processors, and more particularly to efficient inter-thread communication by selective aliasing of register blocks on processors that support hardware multithreading.

Description of the Related Art

Passing parameters and results between procedures and system calls within an execution thread (intra-thread) of a hardware multithreaded processor is almost always performed using registers of a processing system, such as a central processing unit (CPU) or the like. In contrast, passing of information between execution threads (inter-thread) is generally done using shared data structures in memory, even when the threads are executing concurrently on a hardware multithreaded CPU with a set of hardware registers for each thread. This makes inter-thread communication substantially slower than intra-thread communication. Inter-thread communication is also more power-hungry because, in many modern instruction set architectures (ISAs), only register contents can be used as operands of machine instructions, and separate instructions must be executed to load registers from memory or store registers to memory.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Inter-thread communication is enabled through subsets of registers on a processor that supports hardware multithreading, referred to herein as a hardware multithreaded processor. The registers of a register file are divided into register block sets for each of multiple communicating threads, in which each register block set is divided into two (or more) blocks each having multiple registers. The physical location of the second register block of one or more of the register block sets is selectable by software to permit a common register block to be accessed by each of the threads. A thread providing a service can alias a block of the registers of a requester as its second block.

The present disclosure is primarily applicable to hardware multithreaded processors that implement multiple, concurrent processing threads in hardware. Software tasks are assigned to hardware threads when the tasks are initialized and execute on the same threads throughout their operation. A processor that supports hardware multithreading may be distinguished from a processor that only permits software multithreading, in part, by the presence on the hardware multithreaded processor of a full copy of the architectural state of the processor for each hardware thread, including, for example, the program counter. In contrast, a processor that only supports software multithreading may have multiple sets of general purpose registers and/or special purpose registers in order to reduce context switching overhead, but must save and restore (at least) the program counter when switching between threads.

Hardware multithreaded processors are generally processors using coarse-grained multithreading (CGMT) or switch-on-event multithreading (SOEMT), as well as some processors using fine-grained multithreading (FGMT) and the like. While not ISA-specific, embodiments described herein are especially useful on hardware multithreaded processors that use the 32-bit RISC-V ISA. The reason is that the RISC-V ISA specification, unique among common ISAs, includes two, architecturally defined register file sizes: RV32I with 32 general registers (x0-x31), and RV32E with 16 general registers (x0-x15). The instruction sets of RV32I and RV32E are identical, which permits the same program development and debug tools to be used for processors with either register file size. In one embodiment, an application binary interface (ABI) has been defined that uses the registers in the range x0-x15 for all system call and procedure linkage functions, thereby allowing programs compiled for RV32E to run, unmodified, on a processor that implements RV32I.

Figure 1:
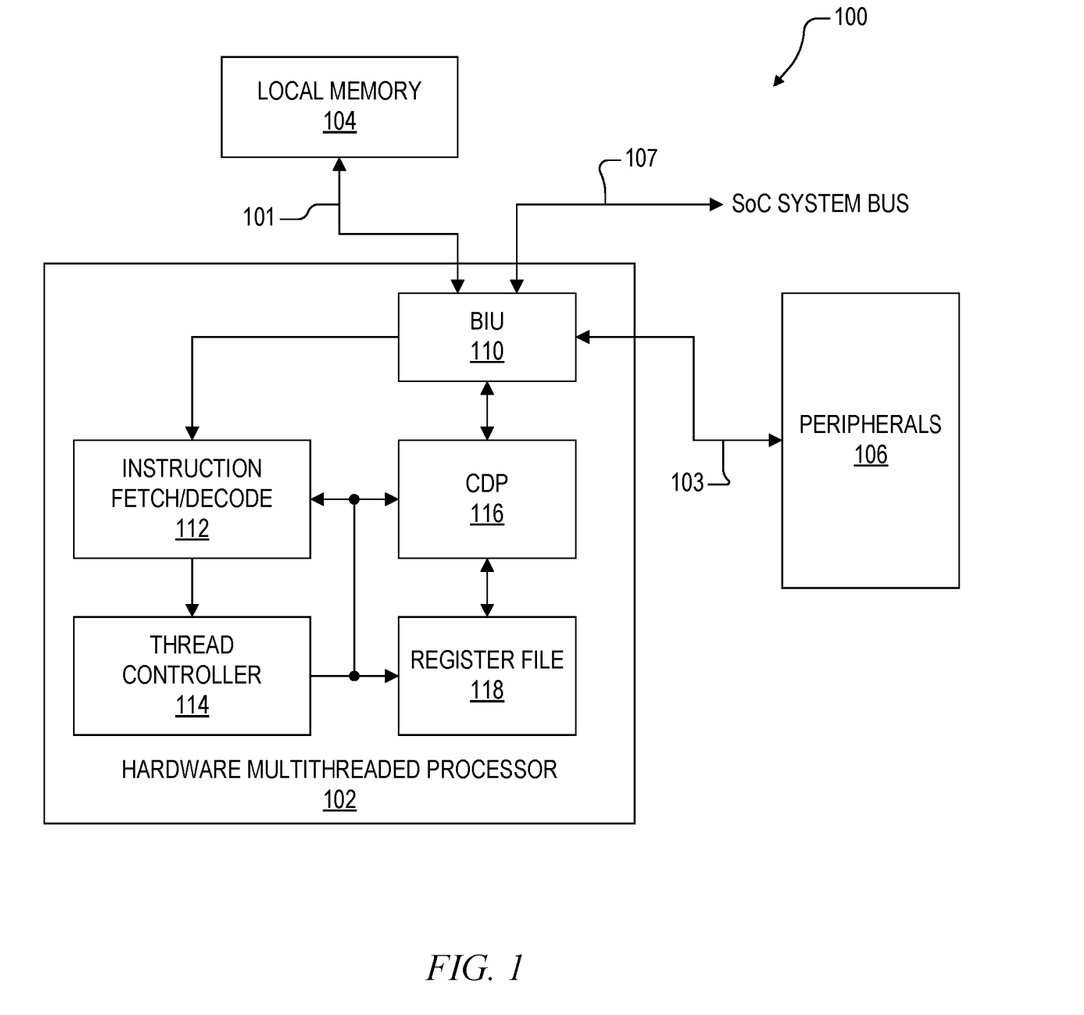
FIG. 1 is a simplified block diagram of a processing system including a hardware multithreaded processor implemented according to one embodiment of the present disclosure.

FIG. 1 is a simplified block diagram of a processing system 100 including a hardware multithreaded processor 102 implemented according to one embodiment of the present disclosure.

The processing system 100 includes the hardware multi-threaded processor 102, a local memory 104 and a set of peripherals 106. The processing system 100 may be part of a system-on-a-chip (SoC), in which case the processor 102 may be coupled to an SoC system bus 107 or the like. In the illustrated embodiment, the processor 102 interfaces the local memory 104 via a memory bus 101 and interfaces the peripherals 106 via a peripheral bus 103. The peripherals 106 may generate events, such as interrupts and the like, which are provided to the processor 102 via the peripheral bus 103 or via other signal interfaces (not shown). The local memory 104 may include any combination of random-access memory (RAM) and read-only memory (ROM) devices and may store program and data and the like. The peripherals 106 may include any type of functional circuitry depending upon the application, such as, for example, first-in, first-out (FIFO) circuitry, cyclic redundancy check (CRC) circuitry, timer circuitry, encryption circuitry, communication circuitry, etc. It is noted that the processing system 100 is shown in simplified form and may include additional devices, elements, components, interfaces and other supporting circuitry that are not shown or described as not necessary for a complete understanding of the present invention.

The processor 102 includes a bus interface unit (BIU) 110, instruction fetch and decode circuitry 112, a thread controller 114, a central data path (CDP) 116, and a register file 118 including a set of registers. The processor 102 may include other functional blocks and circuitry that are not shown. The BIU 110 interfaces the local memory 104, the peripherals 106 and other SoC circuitry via the memory bus 101, the peripheral bus 103, and the SoC system bus 107, respectively. The BIU 100 is further coupled to the instruction fetch and decode circuitry 112 and the central data path 116 within the processor 102. The central data path 116 is further coupled to the instruction fetch and decode circuitry 112, the thread controller 114, and the register file 118.

Specific operation of the processor 102 is not further described other than inter-thread communication by selective aliasing of register blocks of the register file 118 by aliasing circuitry that may be separately provided or located within the thread controller 114 as further described herein. The instruction fetch and decode circuitry 112 retrieves instructions from the local memory 104, in which each instruction includes multiple operand fields for identifying or locating multiple operands each addressing corresponding registers of the register file 118. The processor 102 supports multiple hardware processing threads each associated with or otherwise assigned to a corresponding one of multiple register block sets, in which each register block set includes two or more register blocks (or simply "blocks") of the register file 118 and in which each block includes multiple registers. As described further herein, the register block set of each thread is divided into two (or more) register blocks, with the physical location of a second register block selectable by software to permit a common register block to be accessed by each of the communicating threads. A hardware processing thread providing a service can alias a register block of the registers of a requester as its second block as further described herein.

Figure 2:
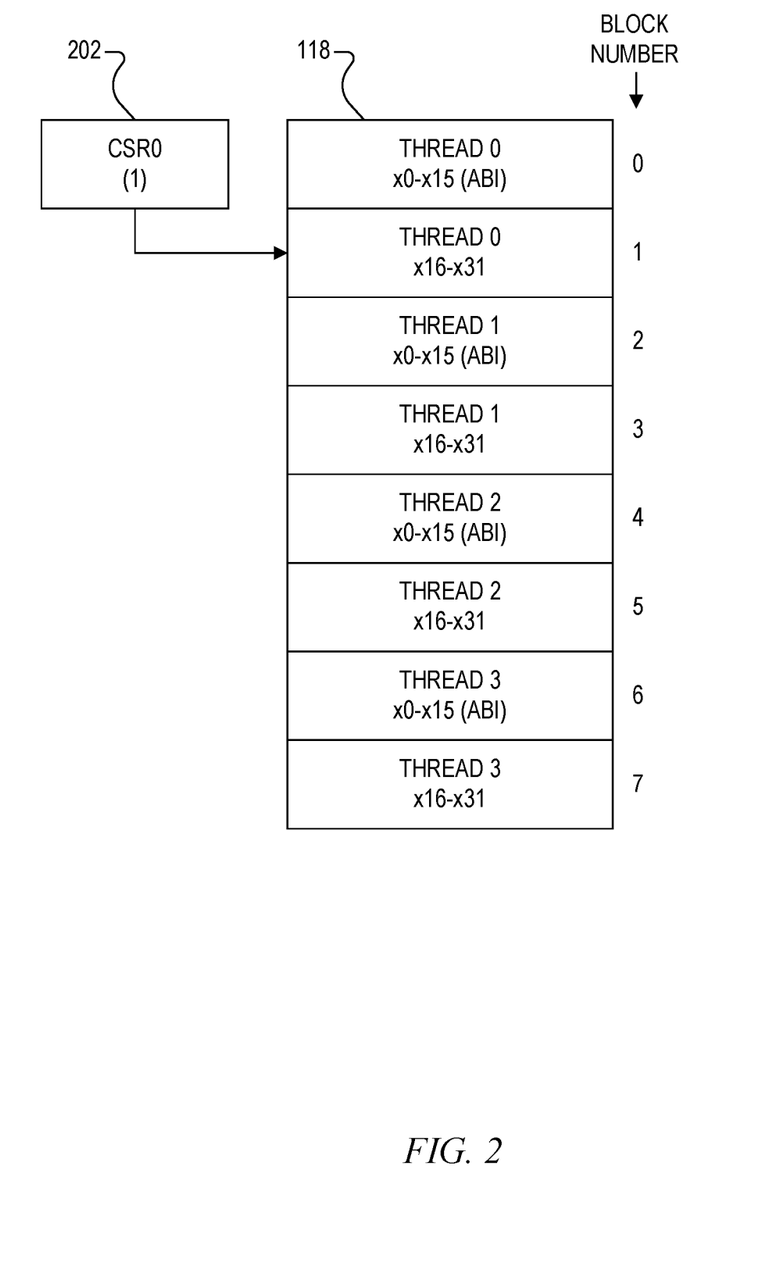
FIG. 2 is a simplified block diagram of the registers subdivided into multiple blocks for supporting multiple processing threads executed by the hardware multithreaded processor of FIG. 1 along with a control/status register (CSR) for a first block 0 (CSR0) programmed with a value "1" for register aliasing according to one embodiment of the present disclosure.

FIG. 2 is a simplified block diagram of the register file 118 subdivided into multiple register blocks for supporting multiple hardware processing threads executed by the hardware multithreaded processor 102 along with a control/status register (CSR) for the first block 0 (or CSR0) 202 for register aliasing according to one embodiment of the present disclosure. The illustrated register file 118 is subdivided into 8 blocks numbered 0 to 7 (0-7) in which each block includes 16 registers for a total of 128 registers. The embodiment shown in FIG. 2 is exemplary only, in which it is appreciated that each register block may include a different number of registers other than 16, that each thread may be assigned to a different number of blocks other than 2 register blocks per thread, and that any number of threads may be supported other than 4.

In a conventional configuration without register block aliasing, each hardware processing thread has a unique thread number and is assigned to a dedicated set of general registers referred to herein as a register block set. Although, in general, each register block set may include a single block of registers (or register block), in the illustrated embodiments described herein each register block set includes two (or more) consecutive register blocks in which each register block includes at least two registers. Each thread issues instructions in which many of the instructions include one or more operand fields each containing a register number identifying a specific register of the register block set assigned to that thread. When the register blocks are consecutively positioned as illustrated by the register file 118 shown in FIG. 2, then the thread controller 114 typically prepends an upper address value based on the thread number to the register number in the instruction operand field to generate a corresponding register file address identifying or locating a specific register of the register file 118 within its own register block set. In this manner, in a conventional configuration by default, each hardware processing thread only has access to the registers within its own register block set.

It is noted that each hardware processing thread may have multiple ways of providing a reference to a register in the register file 118. One such method is providing a register number in an operand field of an instruction as the reference to access a corresponding register storing the operand. As described above, the thread controller 114 uses the register number as a reference to generate a register file address to locate the corresponding register of register file 118 in the register block set assigned to the hardware processing thread. The register number may a considered as a partial address used for generating the full register file address, in which the thread controller 114 normally translates the partial address to the register block assigned to the operative thread. Selective aliasing of register blocks as described herein, however, involves redirecting the reference (or partial address or the like) to a different register block which may be assigned to a different hardware processing thread.

In the particular configuration shown in FIG. 2, each of 4 hardware processing threads numbered 0 to 3 (0-3) is assigned a register block set including 2 consecutive register blocks of the register file 118 in which each register block includes 16 registers, so that each hardware processing thread is assigned access to 32 registers. In this manner, the first thread 0 is assigned access to registers numbered x0 to x15 of a first block 0 and registers numbered x16 to x31 of a second block 1 of a first register block set for thread 0, the second thread 1 is assigned access to registers numbered x0 to x15 of a third block 2 and registers numbered x16 to x31 of a fourth block 3 of a second register block set for thread 1, the third thread 2 is assigned access to registers numbered x0 to x15 of a fifth block 4 and registers numbered x16 to x31 of a sixth block 5 of a third register block set for thread 2, and the fourth thread 3 is assigned access to registers numbered x0 to x15 of a seventh block 6 and registers numbered x16 to x31 of a eighth block 7 of a fourth register block set for thread 3.

For at least one hardware processing thread up to all of the hardware processing threads of the hardware multithreaded processor 102, the second register block of the register block set for a given thread may be aliased and thus redirected to another physical register block of the register file 118, including any register block of any register block set assigned to other hardware processing threads. For example, the physical register block accessed by instructions using registers in the second block (register numbers in the range x16-x31) may be software selectable, either by application software running on that thread, supervisory software running on that thread, or supervisory software running on a different thread, depending on the software architecture and software isolation/security requirements of the processing system 100. The CSR0 202 for the first thread 0 is shown programmed with a value of "1" indicating the default configuration pointing to register block number 1 (or block 1) which is the second register block accessed by the first hardware processing thread 0. Thus, when instructions executed by the hardware processing thread 0 reference registers x16-x31, they reference the corresponding registers of block 1. In this case when the CSR0 202 is programmed according to the default configuration, aliasing has no effect and operates substantially the same as a conventional configuration.

Figure 3:
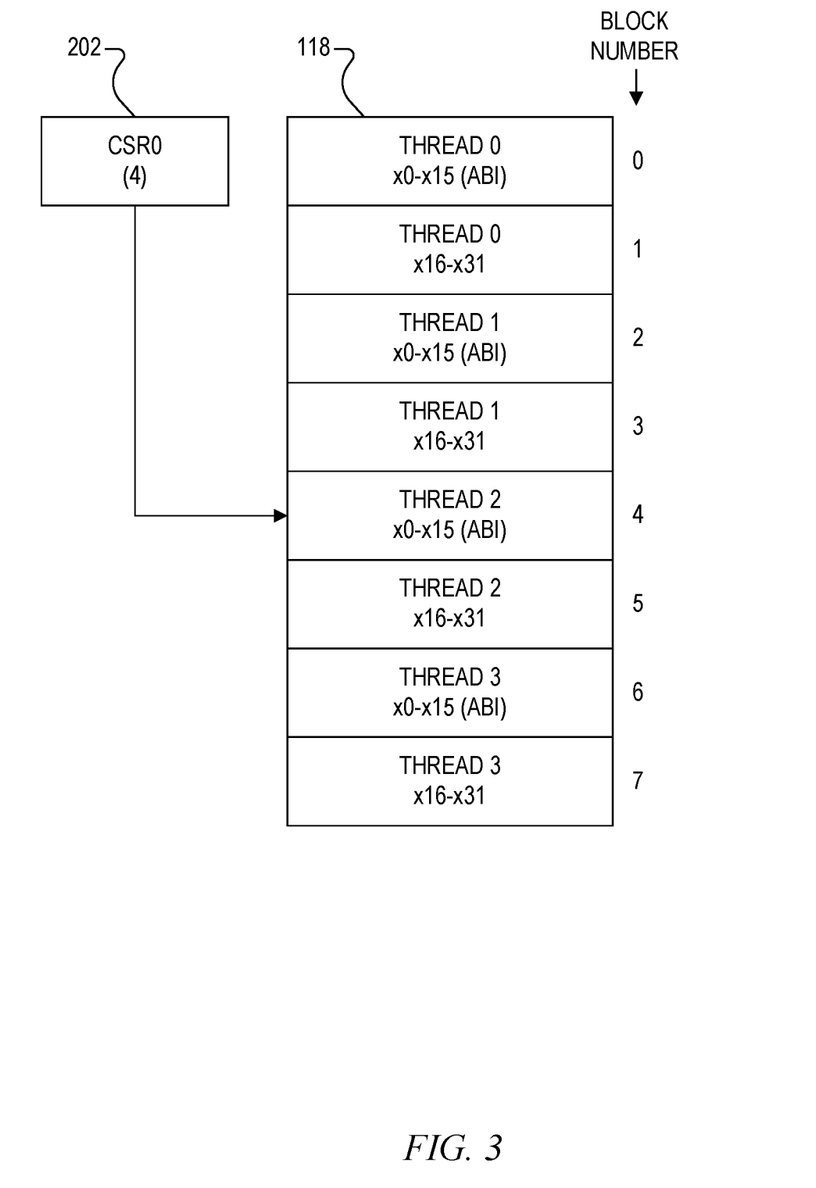
FIG. 3 is a simplified block diagram of the same registers shown in FIG. 2 except with CSR0 programmed with a value "4" for register block aliasing according to an embodiment of the present disclosure.

FIG. 3 is a simplified block diagram of the same register file 118 shown in FIG. 2 except with the control register CSR0 202 programmed with a value "4" for register block aliasing according to an embodiment of the present disclosure. Again, the register file 118 is subdivided into 4 register block sets each including 2 register blocks with 16 registers each for a total of 128 registers, in which each hardware processing thread is assigned to a corresponding one of the 4 register block sets. In this case, however, the control register CSR0 202 is programmed with a value "4" so that register block 4 as an aliased register block for thread 0 such that block 4 becomes the aliased second register block of thread 0. In this manner, when an instruction executed by the hardware processing thread 0 includes an operand field with a register number for addressing any of registers x16-x31, rather than addressing the registers of the register block 1 (which is its normally assigned second register block), it instead addresses the corresponding registers of aliased register block 4. Thus, a reference by thread 0 to register number x17 accesses the same physical register as thread 2 accesses as register x1, a reference by thread 0 to register number x18 accesses the same physical register as thread 2 accesses as x2, and so on. This permits software in thread 0 to obtain parameters directly from, and return results directly to, ABI registers of thread 2, as if the service request had been handled directly by thread 2, and without the overhead of having to exchange the parameters and results through a shared data structure in memory.

Because CSR0 202 is programmed with register block 4 as the aliased second register block of thread 0, thread 0 can make procedure calls in the normal manner, since the ABI linkage registers are in its first register block. During service processing, if the thread 0 needs more temporary registers than are available in its first register block, it can temporarily program CSR0 202 to reselect its own second register block 1, then reprogram CSR0 202 to reinstate the alias of the requester's first register block when it is time to return results from the request being processed. Once software in thread 0 has completed the service request from thread 2, the CSR0 202 may be reset to its default value of "1" to remove the alias and reselect register block 1 as the second register block of thread 0.

The means of conveying the service request from the client thread (e.g., thread 2) to the server thread (e.g., thread 0) should be synchronous, in that the client thread should not execute beyond the request until the request has been completed. This is equivalent to how it would operate if the service were provided fully within the client thread, whether by procedure call or by system call. If the multithreaded hardware uses prioritized, preemptive, switch-on-event multithreading (SOEMT), a request of the type illustrated (i.e., from a lower-priority thread to a higher-priority thread) is inherently synchronous, because the inter-thread request causes preemption of the client (in this case thread 2) by the server (in this case thread 0).

On processors that use other types of multithreading, and/or applications that use aliasing as described herein for inter-thread communication between peer threads, a semaphore or other mutual exclusion construct may be provided for each register block subject to aliased access to ensure that both hardware processing threads are not updating the same register block simultaneously. The specifics of when this mutual exclusion should be used vary due to application specifics and multithread scheduling strategy but are generally the simplest when the threads have a fixed priority relationship, as with SOEMT, or a fixed execution sequence, as with FGMT. The potential hazard cases tend to be of intermediate complexity using non-prioritized CGMT, and very complex using SMT. Another approach is to implement an inter-thread call instruction that, after initiating the call to the target thread, suspends execution by the calling thread until the called thread executes the corresponding inter-thread return instruction.

Figure 4:
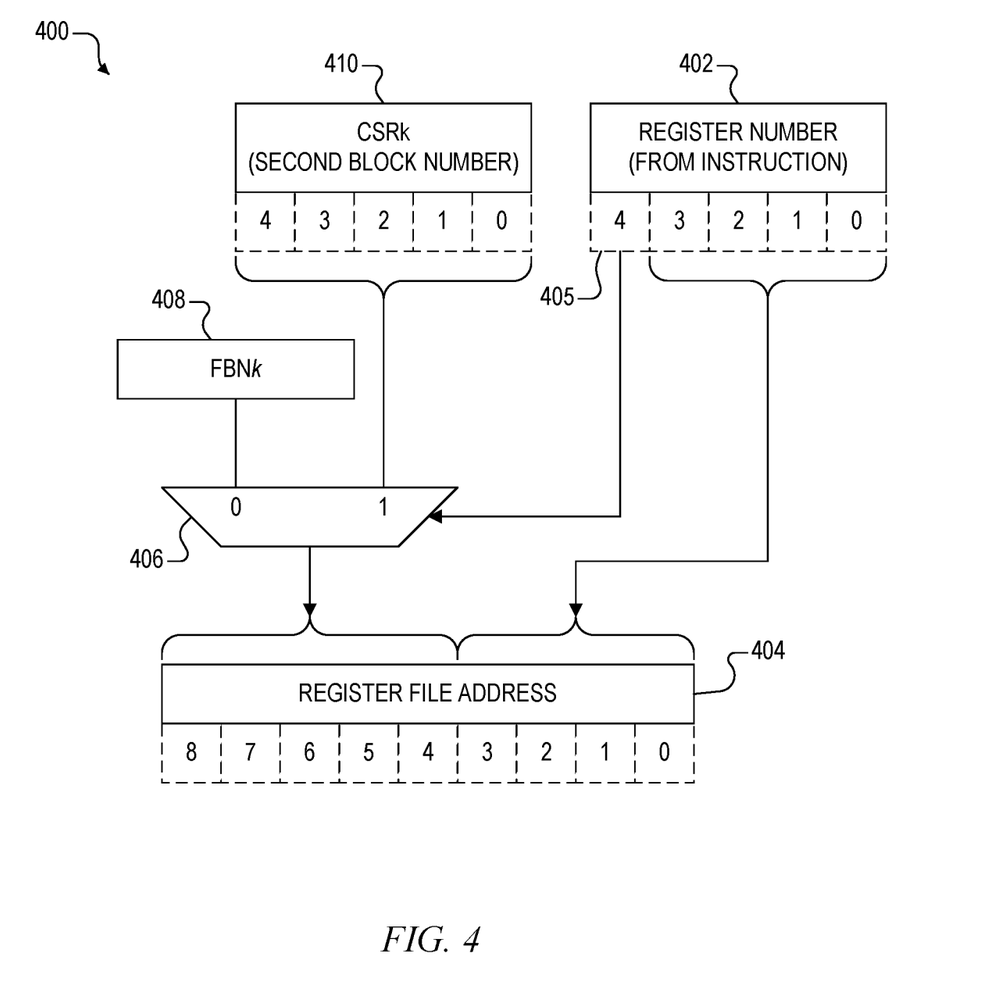
FIG. 4 is a simplified block diagram of aliasing circuitry that may be used within the thread controller of FIG. 1 for aliasing register blocks according to one embodiment of the present disclosure.

FIG. 4 is a simplified block diagram of aliasing circuitry 400 for aliasing register blocks according to one embodiment of the present disclosure. The aliasing circuitry 400 may be located anywhere within the hardware multithreaded processor 102 including within the thread controller 114. The aliasing circuitry 400 is configured to address up to 512 registers subdivided into register blocks of 16 registers each for up to 16 hardware processing threads in which each thread is assigned a register block set including two consecutive register blocks. It is understood that the aliasing circuitry 400 may be used for addressing less than 512 registers or less than 16 threads, or may reconfigured for addressing any suitable number of registers for any suitable number of hardware processing threads each assigned to a register block set with any suitable number of register blocks.

An operand field 402 within an instruction being executed by the currently active hardware processing thread holds a register number identifying a register storing a corresponding operand. An operand field of an instruction may be a standard means of referencing the registers of the register file 118 by each hardware processing thread, although alternative methods are also possible and contemplated. In the illustrated case, the operand field includes 5 bits (numbered 0 to 4) for addressing any one of 32 different registers x0-x31 of the current thread. The 4 least-significant bits (LSBs) of the register number from the operand field 402 are used as the 4 LSBs (numbered 0 to 3) of a register file address 404 for selecting one of the 16 registers of a register block. The most-significant bit (MSB) 405 of the register number, which is normally used as part of a register file address for identifying or otherwise locating a register, is instead used as the selection control input of a multiplexor (MUX) 406, shown here as a 5-bit wide, 2-input MUX. The output of the select circuitry 406 is provided as the 5 MSBs (numbered 4 to 8) of the register file address 404 for addressing a total of 512 registers. The select circuitry 406 has a "0" input receiving the contents of a storage 408 which is selected when the MSB of the register number is "0", and has a "1" input receiving the contents of a corresponding block selection CSR 410 which is selected when the MSB is "1".

The storage 408 stores a first block number (FBN) value FBNk for the current hardware processing thread numbered "k" in which k is an index that identifies the hardware processing thread that is configured with selective aliasing of register blocks. The index value k ranges from 0 (for the first thread 0) to m for the last thread of a total number of threads m+1. The value m may be 15 for a configuration with 16 threads. For the configuration illustrated in FIG. 2 with 128 registers in which m is 4 for threads 0 to 3, then the lower 3 bits of the 5-bit FBNk value are used to identify the first block number of the current thread, such as 00000 b for thread 0 (to identify block 0), 00010 b for thread 1 (to identify block 2), 00100 for thread 2 (to identify block 4, and 00110 for thread 3 (to identify block 6). It is noted that although FBNk may be a programmable value, in one embodiment FBNk is a fixed value that is prepended to the register number to form the register file address of the first register block of the register block set assigned to the hardware processing thread k configured with selective aliasing of register blocks.

The CSR 410 stores a second block number value CSRk for the hardware processing thread k. For the configuration illustrated in FIG. 2 with 128 registers in which m is 4 for threads k=0 to 3, the lower 3 bits of the 5-bit CSRk value are used to identify the second block number of the current thread. For the normal case with 128 registers in which aliasing is not used, CSR 410 stores 00001 b for thread 0 (to identify block 1), stores 00011 b for thread 1 (to identify block 3), stores 00101 b for thread 2 (to identify block 5, and stores 00111 b for thread 3 (to identify block 7). The CSRk value stored in CSR 410, however, may be reprogrammed for aliasing the second block of the current thread. As shown in FIG. 3, for example, when the CSRk value for thread 0 is programmed with a value 4 (or 00100 b) identifying block 4, then when thread 0 uses the addresses x16-x31 which would normally be the registers of block 1 (which is the second block normally assigned to thread 0), it instead addresses the registers of the register block 4, which is otherwise the first block (registers x0-x15) of thread 2.

Figure 5:
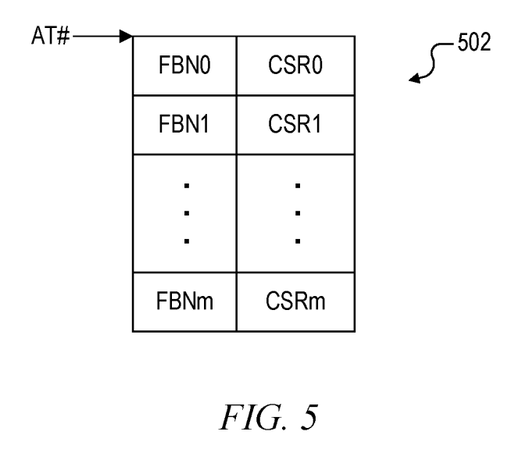
FIG. 5 is a simplified block diagram of a control register file (CRF) for storing FBNk and CSRk values for each of m threads according to one embodiment of the present disclosure.

FIG. 5 is a simplified block diagram of a control register file (CRF) 502 for storing FBNk and CSRk values for each of the k=0, . . . , m threads according to one embodiment of the present disclosure. The CRF 502 may be configured as a lookup table (LUT) or the like in which the active thread number (AT#) may be used as an index to access the corresponding FBNk and CSRk values. The FBN0 to FBNm values may be fixed or otherwise predetermined (e.g., hard-wired or provided by a read-only memory or the like) for accessing the first block number for each of the hardware processing threads. The CSR0 to CSRm values, however, are programmable to allow each thread to alias a register block otherwise associated with other threads.

It is noted that the CRF 502 including CSRk values for each of the hardware processing threads 0–m implies that selective aliasing of register blocks is configured for each of the m+1 threads. It is understood, however, that selective aliasing of register blocks may be configured for only one thread or a selected subset of threads rather than all of the threads.

Figure 6:
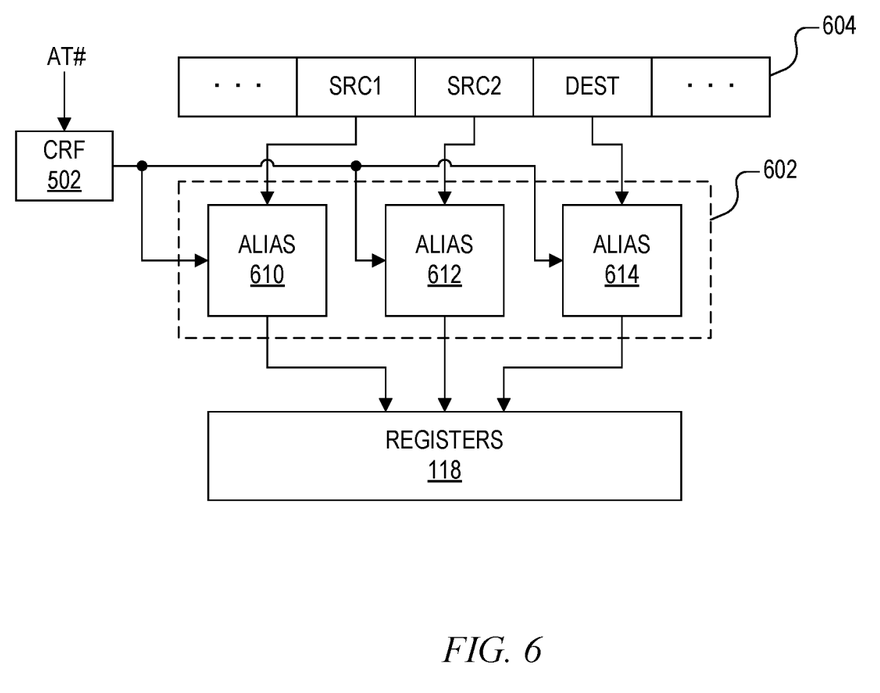
FIG. 6 is a simplified block diagram illustrating operation of alias circuitry within the thread controller of FIG. 1 for converting register numbers provided in operand fields of an instruction to corresponding register addresses using the CRF of FIG. 5 to access corresponding registers within the set of registers according to one embodiment of the present disclosure.

FIG. 6 is a simplified block diagram illustrating operation of alias circuitry 602 for converting register numbers provided in operand fields of an instruction 604 to corresponding register addresses using the CRF 502 to access corresponding registers within the register file 118 according to one embodiment of the present disclosure. The alias circuitry 602 may be provided at any suitable location, such as a standalone block, or within any suitable block such as the thread controller 114, the instruction fetch and decode circuitry 112, the register file 118, etc. The instruction 604 may include multiple operand fields including register numbers for accessing corresponding ones of the registers that store the corresponding operands. In one embodiment, the instruction 604 includes a field SRC1 which contains the number of the register holding the first source operand, a field SRC2 which contains the number of the register holding the second source operand, and a field DEST which contains the register number into which the result is to be stored. The alias circuitry 602 includes a first alias circuit 610 for the SRC1 operand, a second alias circuit 612 for the SRC2 operand, and a third alias circuit 613 for the DEST operand. Each of the alias circuits 610, 612, and 614 may be configured substantially the same as the aliasing circuitry 400 previously described. The active thread number AT# executing the instruction 604 is provided to the CRF 502, and the corresponding FBNk and CSRk values are provided to inputs of the alias circuits 610, 612, and 614. The FBNk value is provided to the storage 408, the CSRk value is provided as the CSR 410, the corresponding operand field provides the register number as the operand field 402, and the corresponding alias circuit redirects access to a corresponding register of a register block set to access the stored operand for executing the instruction.

Figure 7:
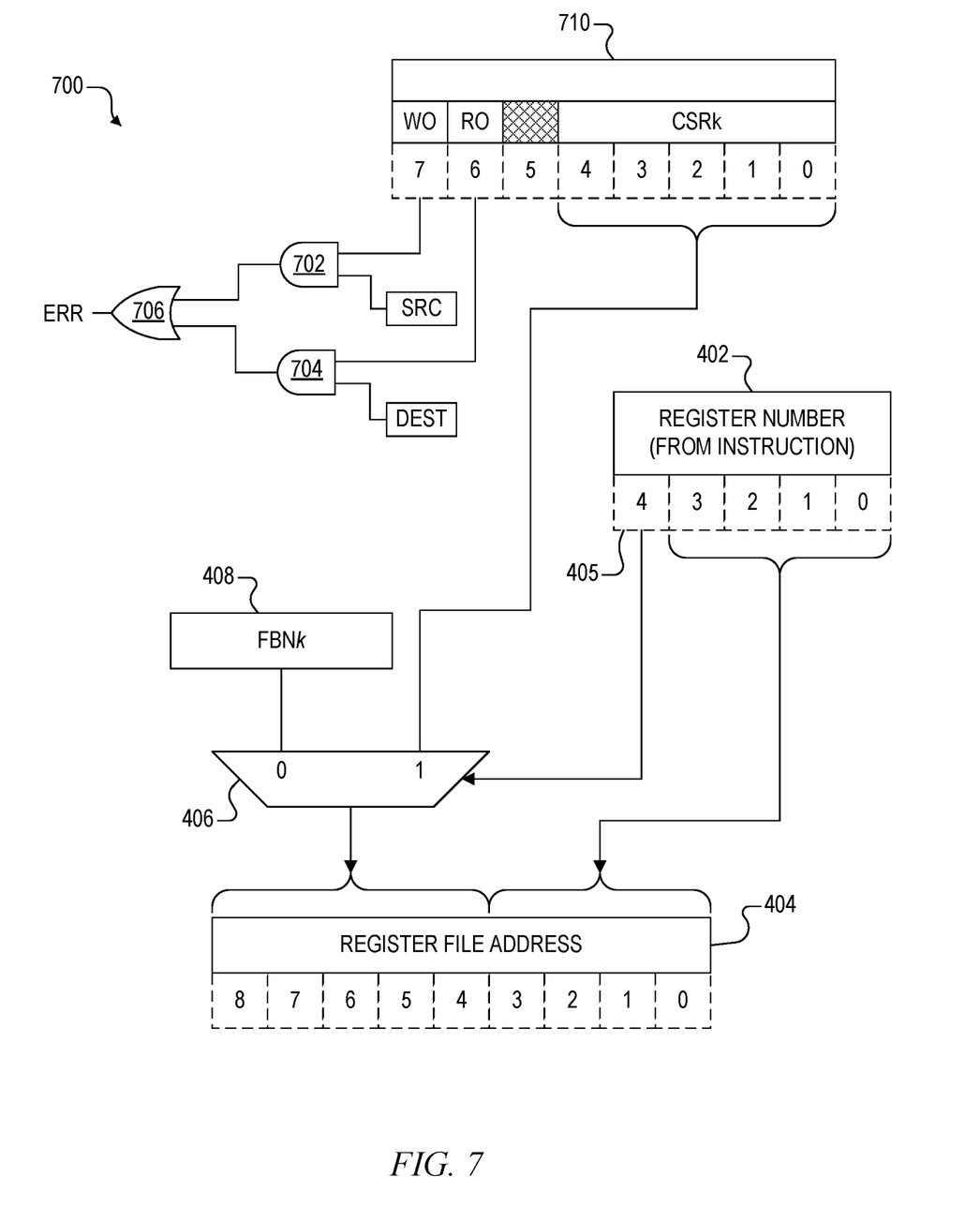
FIG. 7 is a simplified block diagram of aliasing circuitry that may be used within the thread controller of FIG. 1 for aliasing register blocks for a more general case with error detection according to another embodiment of the present disclosure.

FIG. 7 is a simplified block diagram of aliasing circuitry 700 for aliasing register blocks for a more general case according to another embodiment of the present disclosure. The aliasing circuitry 700 may be located anywhere within the hardware multithreaded processor 102 including within the thread controller 114. The aliasing circuitry 700 is substantially similar to the aliasing circuitry 400 and includes the operand field 402 providing the register number, the register file address 404, the select circuitry 406, the storage 408 providing FBNk, and a CSR 710 configured to operate in a similar manner as the CSR 410 with additional protection functionality. In this case, the CSR 710 includes the same CSRk value but is extended to include a read-only (RO) bit (shown as bit number 6) and a write-only (WO) bit (shown as but number 7) in which bit 5 of the CSR 710 is not used. The aliasing circuitry 700 also includes a SRC bit and a DEST bit, along with first and second 2-input Boolean Logic AND gates 702 and 704 and a 2-input Boolean Logic OR gate 706. The WO and SRC bits are provided to the 2 inputs of the AND gate 702, the RO and DEST bits are provided to the 2 inputs of the AND gate 704, and the outputs of the AND gates 702 and 704 are provided to the 2 inputs of the OR gate 706. The output of the OR gate 706 provides an error value ERR denoting an illegal instruction exception.

In operation, the illegal instruction exception is generated if a register block aliased as read-only is accessed via a destination operand address, or if a register block aliased as write-only is accessed via a source operand address. In this manner data in the block may be protected from unauthorized readout (write-only) or unauthorized alteration (read-only). The read-only and write-only bits are in the CSR 710, so they are constant for all accesses to the aliased block. If general access to the aliased block is desired, both RO and WO are set to zero, and access is unrestricted. If the intent is to pass information to the thread using the alias but not permit that thread to overwrite the values in the aliased registers, the RO bit is set so that any attempt to write to an aliased register is aborted as an illegal instruction. If the intent is pass information from the thread using the alias but not permit that thread to read the previous contents of the aliased registers, the WO bit is set so that any attempt to read an aliased register is aborted as an illegal instruction.

For this protection mechanism to provide useful protection, access to the block selection CSR should be restricted to supervisory software or software in a trusted execution environment.

For the embodiments described herein in which software in one thread can access registers belonging to another thread, the possibility of abuse by malicious software or any broader side effects from erroneous software may be increased. The implementations described herein do not attempt to prevent such abuses, and therefore is most appropriate for use when the software in control of the aliasing is trusted, or where the software for threads using the aliasing are written to work together, such as, for example, a pair of threads used to implement the transmit and receive state machines of a network protocol controller. In the case of two (or more) threads written to work together, it is sometimes beneficial to set the CSRs for each of those treads to access a common register block through which the treads communicate directly, unconstrained by the RISC-V ABI.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage or error levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A hardware multithreaded processor, comprising:
a register file comprising a plurality of registers;
a thread controller that is configured to assign each of a plurality of hardware processing threads to a corresponding one of a plurality of register block sets in which each register block set comprises at least two of a plurality of register blocks and in which each register block comprises at least two of the plurality of registers; and
aliasing circuitry that is programmable to redirect a reference provided by a first hardware processing thread to a register of a register block assigned to a second hardware processing thread,
wherein the reference is a register number provided within an instruction issued by the first hardware processing thread which is converted by the aliasing circuitry to a register file address locating a register of the register block assigned to the second hardware processing thread.

2. The hardware multithreaded processor of claim 1, wherein:
the reference provided by the first hardware processing thread is one of a plurality of references stored in corresponding operand fields of an instruction; and
wherein the aliasing circuitry comprises a plurality of aliasing circuits, each for redirecting a corresponding one of the plurality of references to a corresponding register of the register block set assigned to the second hardware processing thread.

3. The hardware multithreaded processor of claim 1, wherein the first and second hardware processing threads communicate directly with each other using the register block set assigned to the second hardware processing thread.

4. A hardware multithreaded processor, comprising:
a register file comprising a plurality of registers;
a thread controller that is configured to assign each of a plurality of hardware processing threads to a corresponding one of a plurality of register block sets in which each register block set comprises at least two of a plurality of register blocks and in which each register block comprises at least two of the plurality of registers; and
aliasing circuitry that is programmable to redirect a reference provided by a first hardware processing thread to a register of a register block assigned to a second hardware processing thread,
wherein the aliasing circuitry comprises:
a control register associated with the first hardware processing thread; and
selection circuitry that is configured to redirect a register number provided in an operand field of an instruction issued by the first hardware processing thread to a register file address of a register in the register block assigned to the second hardware processing thread using a block number stored in the control register.

5. A hardware multithreaded processor, comprising:
a register file comprising a plurality of registers;
a thread controller that is configured to assign each of a plurality of hardware processing threads to a corresponding one of a plurality of register block sets in which each register block set comprises at least two of a plurality of register blocks and in which each register block comprises at least two of the plurality of registers; and
aliasing circuitry that is programmable to redirect a reference provided by a first hardware processing thread to a register of a register block assigned to a second hardware processing thread,
wherein the aliasing circuitry comprises:
a control register associated with the first hardware processing thread that stores a block number of a second register block of a register block set assigned to the second hardware processing thread; and
selection circuitry having a first input receiving a first block number of a first register of a first register block of a register block set assigned to the first hardware processing thread, having a second input coupled to the control register, having a select input receiving a designated bit of a register number provided in an operand field of an instruction issued by the first hardware processing thread, and having an output;

wherein an output of the selection circuitry prepended to remaining bits of the register number forms a register file address locating a register of the second register block set assigned to the second hardware processing thread.

6. A hardware multithreaded processor, comprising:

a register file comprising a plurality of registers;

a thread controller that is configured to assign each of a plurality of hardware processing threads to a corresponding one of a plurality of register block sets in which each register block set comprises at least two of a plurality of register blocks and in which each register block comprises at least two of the plurality of registers; and aliasing circuitry that is programmable to redirect a reference provided by a first hardware processing thread to a register of a register block assigned to a second hardware processing thread, wherein the aliasing circuitry comprises:

a control register that stores a block number of a second register block of a register block set assigned to the second hardware processing thread, a read-only bit and a write-only bit;

selection circuitry having a first input receiving a first block number of a first register of a first register block of a register block set assigned to the first hardware processing thread, having a second input coupled to the control register, having a select input receiving a designated bit of a register number provided in an operand field of an instruction issued by the first hardware processing thread, and having an output;

wherein an output of the selection circuitry prepended to remaining bits of the register number forms a register file address locating a register of the second register block set assigned to the second hardware processing thread; and protection circuitry, comprising:

a source bit identifying whether the operand of the instruction is a source operand and a destination bit identifying whether the operand of the instruction is a destination operand; and logic circuitry that asserts an exception error if the write-only bit and the source bit are both set or if the read-only bit and the destination bit are both set.

7. A hardware multithreaded processor, comprising:

a register file comprising a plurality of registers;

a thread controller that is configured to assign each of a plurality of hardware processing threads to a corresponding one of a plurality of register block sets in which each register block set comprises at least two of a plurality of register blocks and in which each register block comprises at least two of the plurality of registers; and aliasing circuitry that is programmable to redirect a reference provided by a first hardware processing thread to a register of a register block assigned to a second hardware processing thread, wherein the first and second hardware processing threads communicate directly with each other using the register block set assigned to the second hardware processing thread, unconstrained by an application binary interface of the hardware multithreaded processor.

8. A method of inter-thread communication of a hardware multithreaded processor, comprising:

assigning each of a plurality of hardware processing threads to a corresponding one of a plurality of register block sets in which each register block set comprises at least two of a plurality of register blocks and in which each register block assigning each of a plurality of hardware processing threads to a corresponding one of a plurality of register block sets in which each register block set comprises at least two of a plurality of register blocks and in which each register block comprises at least two of a plurality of registers of a register file;

redirecting a reference provided by a first hardware processing thread to a register of a register block assigned to a second hardware processing thread; and comprises at least two of a plurality of registers of a register file;

redirecting a reference provided by a first hardware processing thread to a register of a register block assigned to a second hardware processing thread;

providing a register number within an instruction issued by the first hardware processing thread; and wherein the redirecting comprises converting the register number to a register file address locating a register of the register block assigned to the second hardware processing thread.

9. The method of claim 8, further comprising:

issuing an instruction by the first hardware processing thread including a plurality of operand fields storing a plurality of references; and redirecting each of the plurality of references to a corresponding one of a plurality of registers of the register block set assigned to the second hardware processing thread.

10. The method of claim 8, further comprising performing direct inter-thread communication between the first and second hardware processing threads using the register block set assigned to the second hardware processing thread.

11. A method of inter-thread communication of a hardware multithreaded processor, comprising:

assigning each of a plurality of hardware processing threads to a corresponding one of a plurality of register block sets in which each register block set comprises at least two of a plurality of register blocks and in which each register block comprises at least two of a plurality of registers of a register file;

redirecting a reference provided by a first hardware processing thread to a register of a register block assigned to a second hardware processing thread; and storing a block number of a register block assigned to the second hardware processing thread in a control register associated with the first hardware processing thread;

wherein the redirecting comprises converting a register number provided in an operand field of an instruction issued by the first hardware processing thread to a register file address of a register in the register block assigned to the second hardware processing thread using the block number stored in the control register.

12. A method of inter-thread communication of a hardware multithreaded processor, comprising:

assigning each of a plurality of hardware processing threads to a corresponding one of a plurality of register block sets in which each register block set comprises at least two of a plurality of register blocks and in which each register block comprises at least two of a plurality of registers of a register file;

redirecting a reference provided by a first hardware processing thread to a register of a register block assigned to a second hardware processing thread;

storing a block number of a register block assigned to the second hardware processing thread in a control register associated with the first hardware processing thread;

selecting between a first block number of a first register of a first register block of a register block set assigned to the first hardware processing thread and the stored block number to provide an aliased block number based on a most significant bit of a register number provided in an operand field of an instruction issued by the first hardware processing thread; and generating a register file address locating a register of the second register block set assigned to the second hardware processing thread by prepending the aliased block number to remaining bits of the register number.

13. A method of inter-thread communication of a hardware multithreaded processor, comprising:

assigning each of a plurality of hardware processing threads to a corresponding one of a plurality of register block sets in which each register block set comprises at least two of a plurality of register blocks and in which each register block comprises at least two of a plurality of registers of a register file;

redirecting a reference provided by a first hardware processing thread to a register of a register block assigned to a second hardware processing thread;

storing a block number of a register block assigned to the second hardware processing thread, a read-only bit and a write-only bit in a control register associated with the first hardware processing thread;

selecting between a first block number of a first register of a first register block of a register block set assigned to the first hardware processing thread and the stored block number to provide an aliased block number based on a most significant bit of a register number provided in an operand field of an instruction issued by the first hardware processing thread;

generating a register file address locating a register of the second register block set assigned to the second hardware processing thread by prepending the aliased block number to remaining bits of the register number;

setting a source bit identifying whether the operand of the instruction is a source operand and setting a destination bit identifying whether the operand of the instruction is a destination operand; and asserting an exception error if in response to the write-only bit and the source bit being both set or in response to the read-only bit and the destination bit being both set.

14. A method of inter-thread communication of a hardware multithreaded processor, comprising:

assigning each of a plurality of hardware processing threads to a corresponding one of a plurality of register block sets in which each register block set comprises at least two of a plurality of register blocks and in which each register block comprises at least two of a plurality of registers of a register file;

redirecting a reference provided by a first hardware processing thread to a register of a register block assigned to a second hardware processing thread; and performing direct inter-thread communication between the first and second hardware processing threads using the register block set assigned to the second hardware processing thread, wherein the performing direct inter-thread communication comprises performing direct inter-thread communication unconstrained by an application binary interface of the hardware multithreaded processor.

15. A processing system, comprising:

a memory; and a hardware multithreaded processor coupled to the memory, comprising:

a register file comprising a plurality of registers;

a thread controller that is configured to assign each of a plurality of hardware processing threads to a corresponding one of a plurality of register block sets in which each register block set comprises at least two of a plurality of register blocks and in which each register block comprises at least two of the plurality of registers; and aliasing circuitry that is programmable to redirect a reference provided by a first hardware processing thread to a register of a register block assigned to a second hardware processing thread, wherein the reference is a register number provided within an instruction issued by the first hardware processing thread which is converted by the aliasing circuitry to a register file address locating a register of the register block assigned to the second hardware processing thread.

16. The processing system of claim 15, wherein the hardware multithreaded processor is configured according to the RISC-V architecture.

17. The processing system of claim 15, wherein the memory and the hardware multithreaded processor are part of a system-on-a-chip (SoC) configuration.

* * * * *